United States Patent

Fumia, Jr. et al.

[15] 3,671,648

[45] June 20, 1972

[54] CARBOCYANINE FILTER DYES AND SENSITIZERS FOR SILVER HALIDE EMULSIONS

[72] Inventors: Arthur Fumia, Jr.; Donald W. Heseltine; Leslie G. S. Brooker, all of Rochester, N.Y.

[73] Assignee: Eastman Kodak Company, Rochester, N.Y.

[22] Filed: May 15, 1969

[21] Appl. No.: 825,072

Related U.S. Application Data

[62] Division of Ser. No. 574,947, Aug. 25, 1966.

[52] U.S. Cl. ...............................260/240 R, 96/84, 96/106, 260/468 R, 260/566 B, 260/240.5
[51] Int. Cl. .......................................................C09b 23/08
[58] Field of Search............................260/240.5, 240 R, 563

[56] References Cited

UNITED STATES PATENTS

| | | | |
|---|---|---|---|
| 2,481,022 | 9/1949 | Kendall et al. | 260/240 R |
| 2,705,234 | 3/1955 | Kendall et al. | 260/240.5 |
| 3,479,362 | 11/1969 | Norell | 260/293.4 |

*Primary Examiner*—John D. Randolph
*Attorney*—W. H. J. Kline and William E. Neely

[57] ABSTRACT

New tricarbocyanine dyes derived from enamine and enaminium salts are useful as filter dyes and spectral sensitizers for photographic silver halide emulsions. They sensitize such emulsions over a wavelength range of about from 660 to 850 $\mu$, and higher in some instances, with maximum sensitivity ranging about from 750 to 800 $\mu$.

11 Claims, No Drawings

CARBOCYANINE FILTER DYES AND SENSITIZERS FOR SILVER HALIDE EMULSIONS

This application is a division of our copending application Ser. No. 574,947, filed Aug. 25, 1966.

This invention relates to photographic materials, and more particularly, to a new class of tricarbocyanine dyes derived from enamine and enaminium salts, to filter layers and light-sensitive silver halide emulsions and elements prepared therewith, and to the preparation of these dyes and photographic materials.

It is well known that carbocyanine dyes containing an amino group substituent on the meso carbon atom are useful filter dyes and spectral sensitizers for photographic silver halide emulsions. For example, in Kendall et al., U.S. Pat. No. 2,705,234, issued Mar. 29, 1955, and in Brooker et al., U.S. Pat. No. 2,735,770, issued Feb. 1, 1956, a number of carbocyanine dyes of the above type are described and shown to extend the sensitivity of ordinary silver halide emulsions up to a range of about from 530 to 685 m$\mu$. This sensitivity range is satisfactory for some photographic uses, but insufficient for other uses such as for red and infrared photographic applications. It would, therefore, be highly desirable to provide carbocyanine dyes which would sensitize silver halide emulsions to longer wavelength radiations, for example, substantially above 700 m$\mu$.

We have now made the remarkable discovery that tricarbocyanine dyes derived from certain enamine and enaminium salts are outstanding filter dyes and spectral sensitizers for photographic silver halide emulsions. They sensitize such emulsions over a wavelength range of about from 660 to 850 m$\mu$, and even higher in some instances, with maximum sensitivity ranging about from 750 to 800 m$\mu$. An unexpected feature is that many of the dyes of the invention further show an unusually strong tendency to form so-called J-aggregates. This is particularly true when the groups attached to nitrogen of the heterocyclic rings are sulfoalkyl groups ( Example 3 hereinafter), now U.S. Pat. No. 3,482,978, granted Dec. 9, 1969. Thus, in water solutions, the dyes aggregate and show increased maximum absorption at wavelengths ranging about from 950 to 1090 m$\mu$. To our knowledge, the strongly aggregating dyes of the invention are the first J-aggregating tricarbocyanines to be reported. A number of them J-aggregate so strongly that no trace of the molecular absorption band can be seen. Accordingly, the new tricarbocyanine dyes of the invention are eminently suited for use in red and infrared photographic applications.

It is, therefore, an object of the invention to provide a new class of tricarbocyanine dyes derived from certain enamine and enaminium salts that are useful filter dyes and sensitizers for photographic silver halide emulsions in the red to infrared region of the spectrum.

Another object is to provide novel photographic silver halide emulsions containing therein at least one of the new dyes of the invention, and novel photographic elements prepared therewith.

Another object is to provide novel filter layers comprising a suitable hydrophilic colloid and at least one of the new dyes of the invention.

A further object is to provide means for preparing the new dyes and novel photographic materials of the invention.

Other objects will become evident from a consideration of the general description and the appended claims.

The new class of tricarbocyanine dyes of the invention are represented by the following general formula:

I.

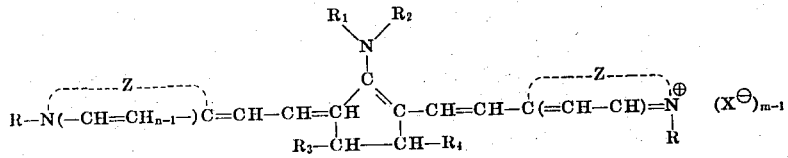

wherein n represents a positive integer of from 1 to 2, R represents an alcohol radical, e.g., an alkyl substituent preferably containing from one to eight carbon atoms such as methyl, ethyl, propyl, isopropyl, butyl, octyl, etc., a hydroxyalkyl group such as $\beta$-hydroxyethyl, $\gamma$-hydroxypropyl, $\delta$-hydroxybutyl, etc., a carboxyalkyl group such as $\beta$-carboxyethyl, $\gamma$-carboxypropyl, etc., a sulfoalkyl group such as $\beta$-sulfoethyl, $\gamma$-sulfopropyl, $\gamma$-sulfo-butyl, $\delta$-sulfobutyl, etc., a sulfatoalkyl group such as $\beta$-sulfa-toethyl, $\gamma$sulfatopropyl, etc., an acyloxyalkyl group such as $\beta$-acetoxyethyl, $\gamma$-acetoxypropyl, $\gamma$-propionyloxypropyl, etc., an aralkyl group such as benzyl, phenylethyl, etc., an aryl group (including substituted aryl) such as phenyl, tolyl, chlorophenyl, sulfophenyl, carboxyphenyl, etc., $R_1$ and $R_2$ each represents an alkyl group of from one to twelve carbon atoms such as methyl, ethyl, propyl, isopropyl, butyl, hexyl, octyl, dodecyl, etc., an alkoxycarbonylalkyl group such as methoxycarbonylmethyl, ethoxycarbonyl-methyl, ethoxycarbonylethyl, etc., an aryl group (including substituted aryl) such as phenyl, m- or p-tolyl, m- or p-chlorophenyl, m- or p-alkoxyphenyl wherein said alkoxy group contains from one to four carbon atoms, such as m-methoxyphenyl, m-ethoxyphenyl, m-propoxy-phenyl, m-butoxyphenyl, p-methoxyphenyl, p-ethoxyphenyl, p-propoxyphenyl, p-butoxyphenyl, etc., $R_3$ and $R_4$ each represents a hydrogen atom, an alkyl group of from one to four carbon atoms, e.g., methyl, ethyl, propyl, isopropyl or butyl, a halogen atom, e.g., chlorine, or bromine, an alkoxy group of from one to four carbon atoms, e.g., methoxy, ethoxy, propoxy, isopropoxy, butoxy, $X^\ominus$ represents an acid anion, e.g., chloride, bromide, iodide, thiocyanate, sulfamate, perchlorate, p-toluenesulfonate, methyl sulfate, ethyl sulfate, etc., m represents a positive integer of from one to 2 such that when m is 1 the symbol R stands for a carboxy-alkyl or a sulfoalkyl radical, and Z represents the non-metallic atoms required to complete the same 5- to 6-membered heterocyclic nucleus, such as those selected from the class consisting of a thiazole nucleus (e.g., thiazole, 4-methyl-thiazole, 4-phen-ylthiazole, 5-methylthiazole, 5-phenylthiazole, 4,5-dimethylthiazole, 4,5-diphenylthiazole, 4-(2-thienylthiazole, etc.), a benzothiazole nucleus, (e.g., benzothiazole, 4-chloro-benzothiazole, 5-chlorobenzothiazole, 6-chlorobenzothiazole, 7-chlorobenzothiazole, 4-methylbenzothiazole, 5-methyl-benzothiazole, 6-methylbenzothiazole, 5-bromobenzothiazole, 6-bromobenzothiazole, 4-phenyl-benzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzo-thiazole, 5,6-dioxymethylenebenzothiazole, 5-hydroxybenzothiazole, 6-hydroxybenzothiazole, etc.), a naphthothiazole nucleus, (e.g., $\alpha$-naphthothiazole, $\beta$-naphthothiazole, 5-methoxy-$\beta$, $\beta$-naphtho-thiazole, 5-ethoxy-$\beta$-naphthothiazole, 8-methoxy-$\alpha$-naphthothiazole, 7-methoxy-$\alpha$-naphthothiazole, etc.,), a thionaphtheno-7', 6', 4,5-thiazole nucleus (e.g., 4'-methox-ythianaphtheno-7', 6', 4,5-thiazole, etc.), an oxazole nucleus (e.g., 4-methyloxazole, 5-methyloxazole, 4-phenyloxazole, 4,5-diphenyloxazole, 4-ethyl-oxazole, 4,5-dimethyloxazole, 5-phenyloxazole, etc.), a benzoxazole nucleus (e.g., benzoxazole, 5-chlorobenzoxazole, 5-methylbenzoxazole, 5-phenyl-benzoxazole, 6-methylbenzoxazole, 5,6-di-methylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.) a naphthoxazole nucleus (e.g., $\alpha$-naphthoxazole, $\beta$-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 5- or 6-nitro-3,3-dimethyl- or 5- or 6-cyano-3,3-dimethylindolenines, 3,3,5-trimethylindolenine, 3,3,7-trimethylindolenine, etc.), an imidazole nucleus (e.g., imidazole 1-alkylimidazole, 1-alkyl-4-phenylimidazole, 1-alkyl-4,5-dimethyl-imidazole, etc.), a benzimidazole nucleus (e.g., benzimidazole, 1-alkylbenzimidazole, 1-aryl-5,6-dichlorobenzimidazole, etc.), a naphthimidazole nucleus (e.g., 1-alkyl-β-naphthimidazole, 1-aryl-β-naphthimidazole, 1-alkyl-5-methoxy-α-naphthimidazole, etc.), etc. It will be understood that the above general formula includes the quaternary salts as well as their betaine forms.

The tricarbocyanine dyes of the invention can be conveniently prepared by condensing a nitrogen heterocyclic compound of the general formula:

II.

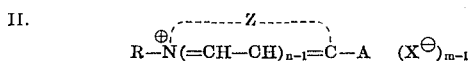

wherein m, n, R, $X^{\ominus}$ and Z are as previously defined, and A represents a methyl group or the group $-CH=CH-NR_5R_6$ wherein $R_5$ represents a hydrogen atom or an acyl group, e.g., acetyl, propionyl, benzoyl, etc., and $R_6$ represents an aryl group, e.g., phenyl, tolyl, etc., with an appropriate enamine or enaminium salt selected from those represented by the following general formulas:

III.

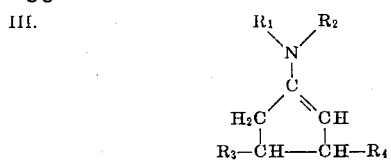

IV

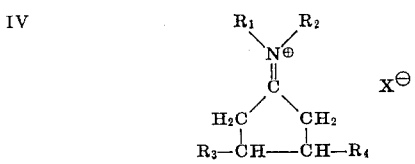

V.

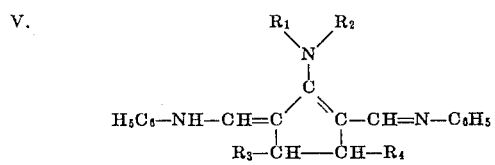

and

VI.

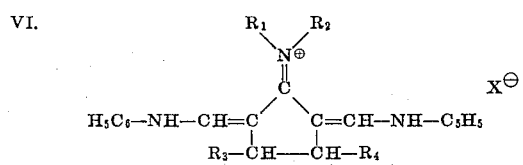

wherein $R_1$, $R_2$, $R_3$, $R_4$ and $X^{\ominus}$ are as previously defined. The intermediate enamine and enaminium salts represented by above Formulas III, IV, V and VI are derived in general as described hereinafter from (1) cyclopentanone and its substitution products and (2) weakly basic amines, i.e., amines having a $pK_a$ of less than about 7, such as for example N-methylaniline, diphenylamine, diethyliminodiacetate, etc. The heterocyclic intermediates represented by above Formula II are all well known substances, and methods for preparing these compounds are well known to the art.

Advantageously, the condensation reactions for preparing the dyes of the invention are carried out in an inert solvent medium such as N,N-dimethylacetamide, a lower alkanol such as ethanol, etc., and in the presence of an acetylating agent such as acetic anhydride if desired, and a basic condensing agent such as a trialkylamine, e.g., triethylamine, tripropylamine, triisopropylamine, etc., N,N-dialkylanilines such as N,N-dimethylaniline, etc., N-alkylpiperidines such as N-methylpiperidine, etc., at elevated temperatures and preferably at refluxing temperatures of the reaction mixtures. On chilling, the dye compounds separate from the mixtures and are purified by one or more extractions or recrystallizations with appropriate solvents. The reactants can be employed with a small excess of one or the other, i.e., greater than the stoichiometrically calculated equivalents, but preferably in the ratio of approximately 2 moles of a heterocyclic compound of above Formula II to each mole of the enamine or enaminium salt of above Formulas III, IV, V and VI.

The following examples further illustrate the novel tricarbocyanine dyes and photographic materials of the invention.

EXAMPLE 1

11-Di(ethoxycarbonylmethyl)amino-3,3'-diethyl-10,12-ethylenethiatricarbocyanine iodide

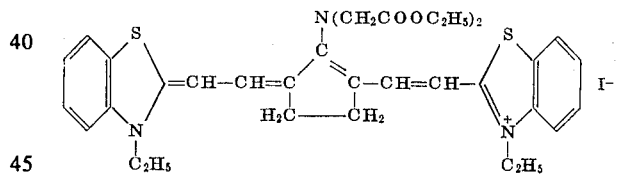

1-Di(ethoxycarbonylmethyl)aminocyclopentene (1.3 g., 1 mol.), 2-(2-acetanilidovinyl)-3-ethylbenzothiazolium iodide (5.0 g., 2 mols. + 10 percent) and triethylamine (0.8 g., 1 mol. + 50 percent) were dissolved in ethanol (30 ml.) and heated under reflux for 15 min. After cooling at room temperature for 5 min., the crude dye was collected on a filter and washed with methanol. After two recrystallizations from methanol, the yield of purified dye was 0.7 g. (18 percent), m.p. 198°–199° C. with decomposition.

EXAMPLE 2

11-Di(ethoxycarbonylmethyl)amino-3,3'-diethyl-10,12-ethylene-4,5; 4',5'-dibenzothiatricarbocyanine p-toluenesulfonate 2-(2-Anilinovinyl)-1-ethylnaphthol[1,2-d]thiazolium p-toluenesulfonate (11.0 g., 2 mols. + 10 percent) ethanol 50 ml., and acetic anhydride (2.1 ml., 2 mols. + 10 percent) were warmed together and then triethylamine (5.0 ml., 3 mols. + 20 percent) and 1-di(ethoxycarbonyl)aminocyclopentene (2.6 g., 1 mol.) were added. The mixture was heated under reflux

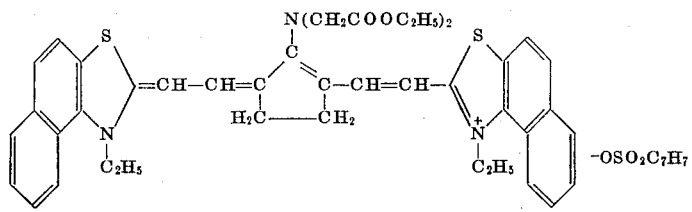

for 10 min. After chilling, the crude product was collected on a filter, washed with ethanol and dried. After two recrystallizations from m-cresol/methanol, the yield of purified dye was 3.0 g. (33 percent), m.p. 221°–222° C. with decomposition.

EXAMPLE 3

Anhydro-11-diphenylamino-10,12-ethylene-3,3'-di(3-sulfopropyl)-4,5; 4',5'-dibenzothiatricarbocyanine hydroxide, triethylamine salt

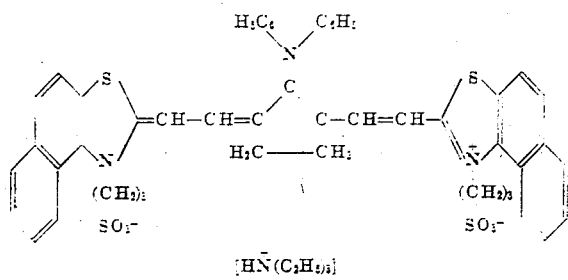

N-(2,5-Dianilinomethylenecyclopentylidene)diphenyl-ammonium perchlorate (2.7 g., 1 mol.), anhydro-2-methyl-1-(3-sulfopropyl)naphtho[,2-d ]thiazolium hydroxide (3.4 g., 2 mols. + 5 percent) and acetic anhydride (1 ml., 2 mols. + 10 percent) were warmed in m-cresol (15 ml.) and then an excess of triethylamine (5.0 ml.) was added. The reaction was then heated under reflux for 2 min., cooled and acetic anhydride (50 ml.) was added. The mixture was then heated to reflux and the hot suspension was filtered. The residue was extracted twice with 100 ml. portions of hot acetone and the yield of dye was 2.8 g. (56 percent), m.p. 231°–232° C., with decomposition. This dye showed (Table 1) maximum absorption in methanol at 830 mμ (the molecular absorption band). When dissolved in water at room temperature it showed a J-aggregate absorption maximum at 1,090 mμ with no suggestion of the molecular band showing.

EXAMPLE 4

Anhydro-3,3'-di(2-carboxyethyl)-5,5'-dichloro-11-diphenylamino-10,12-ethylenethiatricarbocyanine hydroxide

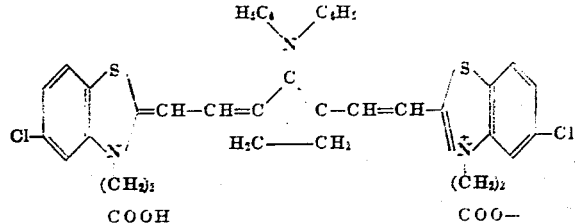

N-(2,5-Dianilinomethylenecyclopentylidene)diphenyl-ammonium perchlorate (2.7 g., 1 mol.), 3-(2-carboxyethyl)-5-chloro-2-methylbenzothiazolium iodide (4.0 g., 2mols. + 5 percent), acetic anhydride (1.0 ml., 2 mols. + 10 percent) were warmed in ethanol (15 ml.) and then triethylamine was added (4.0 ml., 4 mols + 50 percent). The mixture was heated under reflux for 10 min., cooled at room temperature for 5 min. and the crude dye collected on a filter. The crude product was extracted with hot methanol (75 ml.) and dried. The crude dye was purified by stirring it in hot m-cresol, adding triethylamine to form solution, filtering the hot solution, diluting the filtrate with hot methanol, and then adding acetic acid to precipitate the dye. The dye was then collected on a filter, extracted twice with hot methanol and the yield was 2.4 g. (63 percent), m.p. 214°–215° C. with decomposition.

EXAMPLE 5

11-Diphenylamino-10,12-ethylene-3,3'-di(2-hydroxyethyl)thiatricarbocyanine perchlorate

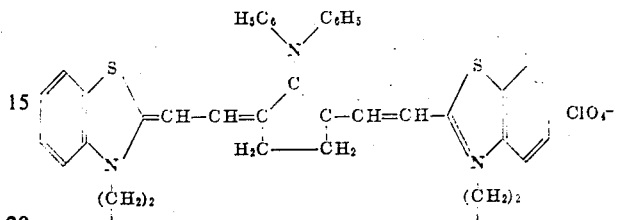

N-(2,5-Dianilinomethylenecyclopentylidene)diphenyl-ammonium perchlorate (2.7 g., 1 mol.), 3-(2-hydroxyethyl)-2-methylbenzothiazolium bromide (2.8 g., 2 mols. + 5 percent), acetic anhydride (1.0 ml., 2 mols. + 10 percent), and triethylamine (3.0 ml., 4 mols. + 10 percent) were reacted in ethanol in the same manner as Example 4. After one recrystallization from N,N-dimethylacetamide/methanol, the yield of purified dye was 1.6 g. (43 percent), m.p. 233°–234° C. with decomposition.

EXAMPLE 6

11-Diphenylamino-3,3'-diethyl-10,12-ethyleneselenatricarbocyanine perchlorate

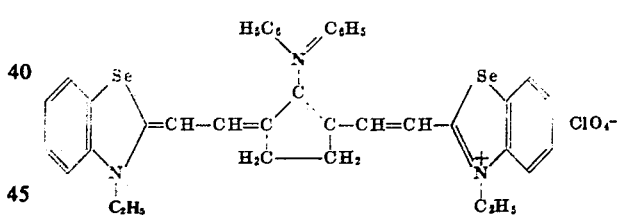

1-Cyclopentylidenediphenylammonium perchlorate (1.4 g., 1 mol.), 2-(2-acetanilidovinyl)-3-ethylbenzoselenazolium iodide (5.5 g., 2 mols. + excess) and triethylamine (1.5 ml., 2 mols. + excess) were dissolved in acetic anhydride (15 ml.) and heated under reflux for 10 min. After cooling at room temperature for 5 min., the crude dye was collected on a filter, washed with methanol and dried. After one recrystallization from N,N-di-methylacetamide/methanol/ether, the yield of purified dye was 0.5 g. (15 percent), m.p. 243°–244° C. with decomposition.

EXAMPLE 7

3,3'-Diethyl-10,12-ethylene-11-(N-methylanilino) oxatricarbocyanine perchlorate

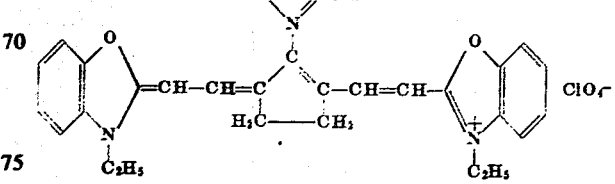

1-Cyclopentylidenemethylphenylammonium perchlorate (1.4 g., 1 mol.), 2-(2-acetanilidovinyl)-3-ethylbenzoxazolium iodide (4.8 g., 2 mols. + 10 percent), and triethylamine (1.5 ml., 2 mols. + 10 percent) were dissolved in acetic anhydride (15 ml.) and heated under reflux for 10 min. After cooling at room temperature for 5 min., the crude product was collected on a filter, washed with methanol and dried. After one recrystallization from methanol, the yield of purified dye was 0.3 g. (10 percent), m.p. 251°–252° C. with decomposition.

EXAMPLE 8

Anhydro-3,3'-di(2-carboxyethyl)-5,5'-dichloro-10,12-ethylene-11-N-methylanilinothiatricarbocyanine hydroxide

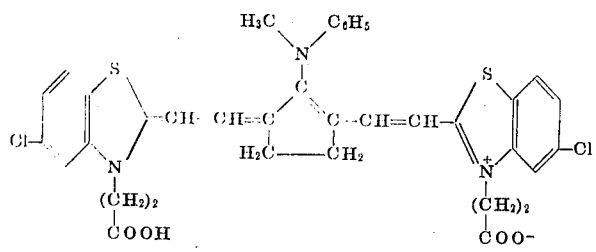

3-Anilinomethylene-2-(N-methylanilino)-1-phenyliminomethylcyclopentene (1.9 g., 1 mol.), 3-(2-carboxyethyl)-5-chloro-2-methylbenzothiazolium iodide (4.2, 2 mols. + 10 percent), acetic anhydride (0.5 ml., 1 mole + 10 percent), and triethylamine (2.3 ml., 3 mole + 10 percent) were dissolved in ethanol (20 ml.) and heated under reflux for 5 min. The reaction mixture was filtered hot and the residue (crude dye) was extracted with hot methanol (150 ml.). The crude dye was purified by dissolving it in methanol containing triethylamine, filtering the hot solution and treating it with acetic acid to precipitate the dye as the free acid. The yield of purified dye was 0.6 g. (17 percent), m.p. 202°–203° C. with decomposition.

EXAMPLE 9

5,5'-Dichloro-3,3'-diethyl-10,12-ethylene-11-N-methylanilinothiatricarbocyanine iodide

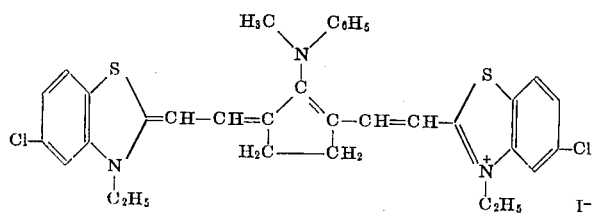

3-Anilinomethylene-2-(N-methylanilino)-1-phenyliminomethylcyclopentene (1.9 g., 1 mol.), 5-chloro-3-ethyl-2-methyl-benzothiazolium iodide (3.7 g., 2 mols. + 10 percent), acetic anhydride (0.5 ml., 1 mol. + 10 percent), and triethylamine (2.1 ml., 2 mols. + 50 percent) were dissolved in ethanol (15 ml.) and heated under reflux for 5 min. The reaction mixture was filtered hot and the residue (crude dye) was washed with ethanol and dried. The crude dye was initially purified by dissolving it in hot N,N-dimethylacetamide, filtering the solution, and then precipitating the dye by the addition of hot methanol. The dye was purified further by a recrystallization from methanol and the yield was 0.9 g. (24 percent), m.p. 242°–243° C. with decomposition.

EXAMPLE 10

Anhydro-10,12-ethylene-11-methylanilino-3,3'-di(3-sulfopropyl)thiatricarbocyanine hydroxide, sodium salt

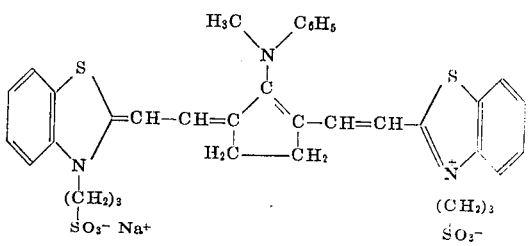

1-Cyclopentylidenemethylphenylaminium perchlorate (1.4 g., 1 mol.), anhydro-2-(2-anilinovinyl)-3-(3-sulfopropyl)benzothiazolium hydroxide, and an excess of triethylamine (4.0 ml.) were dissolved in acetic anhydride (20 ml.) and heated under reflux for 10 min. After cooling, an acetone solution of sodium iodide (1.5 g.) was added and a sticky mass separated. Additional acetone was added and the mixture was heated to a boil with stirring. After chilling, the crude dye was collected on a filter and it was recrystallized by suspending it in hot methanol and then adding water to obtain solution. The yield of purified dye was 0.2 g. (5 percent), m.p. 245°–246° C. with decomposition.

The following examples illustrate the preparation of the enamine and enaminium salt intermediates employed in the above Examples 1 to 10.

EXAMPLE 11

1-Di(ethoxycarbonylmethyl)aminocyclopentene

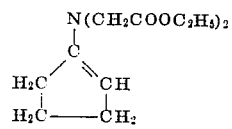

Cyclopentanone (25.2 g., 1 mol.) and diethyliminodiacetate (85.0 g., 1 mol. + 50 percent) were dissolved in benzene (90 ml.) and heated under reflux for 24 hours in an apparatus designed for the continuous removal of water. The benzene and excess diethyliminodiacetate were then removed by distillation under reduced pressure and the residue distilled under vacuum. The yield of product was 34.3 g. (45 percent), b.p. 125°–130° C./1.0 mm. Hg.

EXAMPLE 12

1-Cyclopentylidenediphenylammonium perchlorate

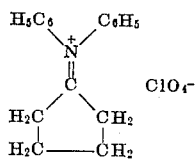

Diphenylamine hydroperchlorate (27.0 g., 1 mol.) and cyclopentanone (10.1 g., 1 mol. + 10 percent) were stirred with ethanol (50 ml.) at room temperature. The product began to precipitate before complete solution took place and the mixture was heated to reflux. After cooling to room temperature, the solid was collected on a filter, washed with ethanol and dried. The yield of product was 28.2 g. (84 percent), m.p. 202°–203° C. with decomposition.

EXAMPLE 13

N-(2,5-dianilinomethylenecyclopentylidene)diphenyl-ammonium perchlorate

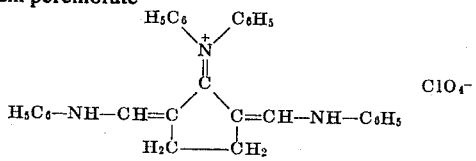

1-Cyclopentylidenediphenylammonium perchlorate (29.1 g., 1 mol.) and ethylisoformanilide (38.7 g., 2 mols. + 50 percent) were mixed thoroughly and heated in an oil bath at 140° C. for ½ hour. After cooling, the cake was crushed under methanol and the solid collected on a filter. The yield of product was 43 g. (91 percent), m.p. 180°–181° C. with decomposition.

EXAMPLE 14

1-Cyclopentylidenemethylphenylammonium perchlorate

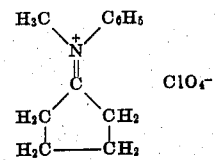

N-methylaniline (11.6 g., 1 mol. + 5 percent) was dissolved in cyclopentanone (16.8 g., 1 mol. + 100 percent) and 72 percent perchloric acid (14.0 g., 1 mol.) was added in small portions with cooling. The mixture was heated on a steam bath for 15 min. and then cooled. After seeding with crystals from a test tube experiment, some product precipitated and the mixture was diluted to a volume of 300 ml. with ether and decanted. The residue was stirred with ethanol (30 ml.) and then collected on a filter. The yield of product was 22.3 g. (81 percent), m.p. 125°–128° C. with decomposition.

EXAMPLE 15

3-Anilinomethylene-2-(N-methylanilino)-1-phenyliminomethylcyclopentene

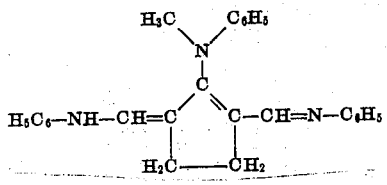

1-Cyclopentylidenemethylphenylammonium perchlorate (27.4 g., 1 mol.) and ethylisoformanilide (37.3 g., 2 mols. + 25 percent) were dissolved in N,N-dimethylacetamide (60 ml.) and heated under reflux for 3 min. The reaction was then allowed to stir until it had reached room temperature. The mixture was then diluted with methanol and the solid collected on a filter. After extracting the solid with hot methanol, the yield of product was 26.0 g. (69 percent), m.p. 228°–229° C. with decomposition.

EXAMPLE 16

This example illustrates the absorption characteristics in methanol and in water solutions of a number of the tricarbocyanine dyes of the invention. The values obtained are listed in the following Table 1 as wavelengths of maximum absorption in methanol and as J-aggregates in water solutions.

TABLE 1

Maximum Absorption λ

| Dye of Example No. | In Methanol Solution (Molecular) | In Aqueous Solution (J-Aggregates) |
|---|---|---|
| 1 | 770 mμ | 960 mμ |
| 2 | 810 mμ | 950 mμ |
| 3 | 830 mμ | 1090 mμ |
| 4 | 800 mμ | 1025 mμ |
| 5 | 795 mμ | 1020 mμ |
| 6 | 800 mμ | 1030 mμ |
| 10 | 810 mμ | 1080 mμ |

EXAMPLE 17

This example illustrates the sensitizing effects in photographic silver halide emulsions of a number of the tri-carbocyanine dyes of the invention.

The dyes listed in Table 2 below were tested in a silver bromoiodide emulsion containing 0.77 mole percent iodide of the type described by Trivelli and Smith, Phot, Journal, 79, 330 (1939). The dyes, dissolved in suitable solvents, were added to separate portions of the emulsions at the concentrations indicated. The emulsions were then coated at a coverage of 432 mg. silver/ft² on a cellulose acetate film support. A sample of each coating was exposed on an Eastman IB Sensitometer and to a wedge spectrograph, processed for three minutes in a developer of the following composition:

DEVELOPER

| | |
|---|---|
| N-methyl-p-aminophenol sulfate | 2.0 g. |
| Sodium sulfite (anhydrous) | 90.0 g. |
| Hydroquinone | 8.0 g. |
| Sodium carbonate (monohydrate) | 52.5 g. |
| Potassium bromide | 5.0 g. |
| Water to make | 1.0 liter | and then fixed, washed and dried. The sensitizing values obtained are shown in the following Table 2.

TABLE 2

Sensitometric Data

| Dye of Example No. | Dye concentration (g/mole silver) | Emulsion Type | Sensitizing Range (mμ) | Sensitization Maximum (mμ) |
|---|---|---|---|---|
| 1 | 0.02 | Bromoiodide | 750 to 850 | 800 |
| 4 | 0.02 | Bromoiodide | 720 to 790 | 750 |
| 5 | 0.02 | Bromoiodide | 710 to 790 | 755 |
| 7 | 0.02 | Bromoiodide | 660 to 810 | 760 |

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of my new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of our new dyes, the following procedure is satisfactory: A

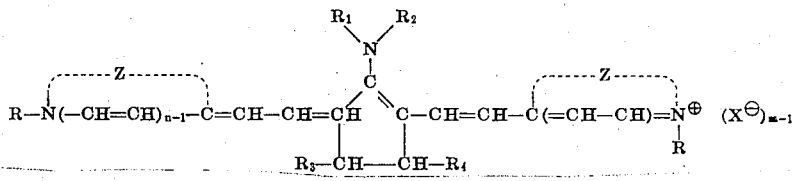

quantity of the dye is dissolved in a suitable solvent and a volume of this solution containing from 5 to 100 mgs. of dye is slowly added to about 1000 cc. of a gelatino-silver halide emulsion. With most of our dyes, 10 to 20 mgs. of dye per liter of emulsion suffice to produce the maximum sensitizing effect with the ordinary gelatino-silver halides including silver chloride, bromide, bromoiodide, chlorobromide, chlorobromoiodide, etc. emulsions. With fine-grain emulsions, which include most of the ordinary employed gelatino-silver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allyl-isothiocyanate, cystine, etc.), various gold compounds (e.g., potassium chloroaurate, auric trichloride, etc.) (see U.S. Pat. No. to W. D. Baldsiefen 2,540,085, granted Feb. 6, 1951; R. E. Damschroder U.S. Pat. No. 2,597,856, granted May 27, 1952, and H. C. Yutzy et al., U.S. Pat. No. 2,597,915, granted May 27, 1952), various palladium compounds, such as palladium chloride (W. D. Balsiefen U.S. Pat. No. 2,540,086, granted Feb. 6, 1951), potassium chloropalladate (R. E. Stauffer et al. U.S. Pat. No. 2,598,079, granted May 27, 1952), etc., or mixture of such sensitizers; antifoggants, such as ammonium chloroplatinate (A. P. H. Trivelli et al. U.S. Pat. No. 2,566,245, granted Aug. 28, 1951), ammonium chloroplatinite (A. P. H. Trivelli et al. U.S. Pat. No. 2,566,263, granted Aug. 28, 1951), benzotriazole, nitrobenzimidazole, 5-nitroindazole, benzidine, mercaptans, etc. (see Mees, "The Theory of the Photographic Process", MacMillan Pub., 1942, page 460), or mixtures thereof; hardeners, such as formaldehyde (A. Miller U. S. Pat. No. 1,763,533, granted June 10, 1930), chrome alum (U.S. Pat. No. 1,763,533), glyoxal (J. Brunken U.S. Pat. No. 1,870,354, granted Aug. 9, 1932), dibromacrolein O. Block et al British 406,750, accepted Mar. 8, 1934), etc.; color couplers, such as those described in I. F. Salminen et al. U.S. Pat. No. 2,423,730, granted July 7, 1947, Spence and Carrol U.S. Pat. No. 2,640,776, issued June 2, 1953, etc.; or mixtures of such addenda. Dispersing agents for color couplers, such as those set forth in U. S. patents to E. E. Jelley et al. U.S. Pat. No. 2,322,027, granted June 15, 1943, and L. D. Mannes et al. U.S. Pat. No. 2,304,940, granted Dec. 15, 1942, can also be employed in the above-described emulsions.

Although the invention has been described in detail with particular reference to preferred embodiments thereof, it will be understood that variations and modifications can be effected within the spirit and scope of the invention as described hereinbefore.

We claim:

1. A tricarbocyanine dye compound represented by the following general formula:

wherein $n$ represents a positive integer of from 1 to 2, R represents a member selected from the group consisting of an alkyl group having 1 to 8 carbon atoms, a hydroxyalkyl group having two to four carbon atoms, a carboxy(low carbon alkyl)group, a low carbon sulfoalkyl group, a low carbon sulfatoalkyl group, an alkanoyloxyalkyl group wherein the alkyl portion of the alkanoyl group and the oxyalkyl group is a low carbon alkyl group, benzyl, phenylethyl, phenyl, a tolyl group, a chlorophenyl group, a sulfophenyl group and a carboxyphenyl group; $R_1$ and $R_2$ each represents a member selected from the group consisting of an alkyl group having from one to 12 carbon atoms, a (lower) alkoxycarbonyl(lower)alkyl group, phenyl, tolyl, chlorophenyl and (lower)alkoxyphenyl; $R_3$ and $R_4$ each represents a member selected from the group consisting of a hydrogen atom, an alkyl group of from one to four carbon atoms, a halogen atom and an alkoxy group containing from one to four carbon atoms; $X^-$ represents an acid anion; $m$ represents a positive integer of from 1 to 2 such that when $m$ is 1 said R represents a member selected from the group consisting of a carboxyalkyl radical and a sulfoalkyl radical; and Z represents the nonmetallic atoms required to complete the same 5- to 6-membered heterocyclic nucleus selected from the class consisting of a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindolenine nucleus, an imidazole nucleus, a benzimidazole nucleus, and a naphthimidazole nucleus.

2. A dye compound in accordance with claim 1 wherein R represents a member selected from the group consisting of an alkyl group having one to eight carbon atoms, a carboxy(low carbon alkyl)group, and a low carbon sulfoalkyl group.

3. A dye compound in accordance with claim 1 wherein Z represents the nonmetallic atoms required to complete a benzothiazole nucleus.

4. A dye compound in accordance with claim 1 wherein Z represents the nonmetallic atoms required to complete a naphthothiazole nucleus.

5. A dye compound in accordance with claim 1 wherein Z represents the nonmetallic atoms required to complete a benzoxazole nucleus.

6. A dye compound in accordance with claim 1 wherein Z represents the nonmetallic atoms required to complete a benzoselenazole nucleus.

7. A dye compound in accordance with claim 1 wherein the dye compound is 11-di(ethoxycarbonylmethyl)amino-3,3'-diethyl-10,12-ethylene-thiatricarbocyanine iodide.

8. A dye compound in accordance with claim 1 wherein the dye compound is anhydro-11-diphenylamino-10,12-ethylene-3,3'-di(3-sulfopropyl)-4,5;4',5'-dibenzothiatricarbocyanine hydroxide.

9. A dye compound in accordance with claim 1 wherein the dye compound is anhydro-3,3'-di(2-carboxyethyl)-5,5'-dichloro-11-diphenylamino-10,12-ethylene-thiatricarbocyanine hydroxide.

10. A dye compound in accordance with claim 1 wherein the dye compound is 3,3'-diethyl-10,12-ethylene-11-(N-methylani-lino)oxatricarbocyanine perchlorate.

11. A dye compound in accordance with claim 1 wherein the dye compound is anhydro-10,12-ethylene-11-methylanilino-3,3'-di(3-sulfopropyl)thiatricarbocyanine hydroxide, sodium salt.

* * * * *